(12) United States Patent
Banham et al.

(10) Patent No.: US 12,331,644 B2
(45) Date of Patent: Jun. 17, 2025

(54) WATER DISPENSING MANAGEMENT FOR AUTONOMOUS MACHINES

(71) Applicant: Caterpillar Inc., Peoria, IL (US)

(72) Inventors: Mark Howard Banham, Victoria Point (AU); Ruchi Bhatia, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 401 days.

(21) Appl. No.: 17/813,133

(22) Filed: Jul. 18, 2022

(65) Prior Publication Data

US 2024/0018870 A1   Jan. 18, 2024

(51) Int. Cl.
| | |
|---|---|
| G05B 13/04 | (2006.01) |
| E01H 3/02 | (2006.01) |
| E21F 5/02 | (2006.01) |

(52) U.S. Cl.
CPC ............ *E21F 5/02* (2013.01); *E01H 3/02* (2013.01); *G05B 13/048* (2013.01)

(58) Field of Classification Search
CPC ............ E21F 5/02; E01H 3/02; G05B 13/048
See application file for complete search history.

(56) References Cited

U.S. PATENT DOCUMENTS

| | | | |
|---|---|---|---|
| 9,037,304 B2 | 5/2015 | Anderton et al. | |
| 9,463,483 B2 | 10/2016 | Gudat et al. | |
| 9,486,825 B2 | 11/2016 | Ngo et al. | |
| 9,766,637 B2 | 9/2017 | Kou et al. | |
| 11,247,777 B2 | 2/2022 | Grimm et al. | |
| 12,029,156 B1 * | 7/2024 | Simpson | A01D 34/008 |
| 2012/0130552 A1 | 5/2012 | Schmidt et al. | |
| 2014/0084081 A1 * | 3/2014 | Kunz | E01H 3/02 |
| | | | 239/172 |
| 2016/0298306 A1 * | 10/2016 | de Kontz | E01C 21/00 |
| 2016/0299511 A1 | 10/2016 | de Kontz et al. | |
| 2017/0343485 A1 * | 11/2017 | Garrison | G01S 13/003 |
| 2020/0125098 A1 * | 4/2020 | Cavender-Bares | |
| | | | G05D 1/0231 |
| 2020/0325647 A1 * | 10/2020 | Nichols | E02D 3/026 |
| 2020/0364456 A1 * | 11/2020 | Tran | G06Q 50/02 |
| 2021/0149406 A1 * | 5/2021 | Javault | A01C 21/005 |
| 2022/0183243 A1 * | 6/2022 | Gilbert | G06Q 50/02 |
| 2023/0263110 A1 * | 8/2023 | Friell | G06Q 10/063 |
| | | | 700/275 |

OTHER PUBLICATIONS

Written Opinion and International Search Report for Int'l. Patent Appln. No.PCT/US2023/069179, mailed Sep. 20, 2023 (14 pgs).

* cited by examiner

*Primary Examiner* — Gary Collins

(57) ABSTRACT

A device may determine a current level of moisture of a section of a ground surface. The device may determine a moisture removal rate of the section of the ground surface. The device may predict an expected level of moisture of the section of the ground surface at an estimated time of arrival of an autonomous machine with a water dispensing unit and determine an amount of water to be dispensed by the autonomous machine at the section of the ground surface. The expected level of moisture may be predicted based on the current level of moisture and the moisture removal rate. The amount of water may be determined based on the expected level of moisture and a desired level of moisture. The device may provide a command, to the autonomous machine, to cause the autonomous machine to dispense the amount of water to the section of the ground surface.

20 Claims, 3 Drawing Sheets

WATER DISPENSING MANAGEMENT FOR AUTONOMOUS MACHINES

TECHNICAL FIELD

The present disclosure relates generally to water dispensing management and, for example, to water dispensing management for controlling water dispensed by autonomous machines.

BACKGROUND

A mine site may be subject to an undesirable amount of dust from a ground surface. The dust may be caused by machines performing tasks at the mine site and/or by environmental conditions, among other examples. Such an undesirable amount of dust may complicate operations of the machines at the mine site.

In some situations, the dust may be suppressed by dispensing water on the ground surface. Dispensing water may also prevent degradation of the ground surface. Unless an appropriate amount of water is dispensed, the undesirable amount of dust may remain and/or the ground surface may remain subject to degradation.

For example, providing an insufficient amount of water on the ground surface may not sufficiently reduce the undesirable amount of dust. Conversely, providing an excessive amount of water may cause degradation of the ground surface. Operating the machine when the mine site is subject to the undesirable amount of dust and/or when the ground surface remains subject to degradation may cause damage to the machines, may prevent the machines from properly performing the tasks, or may cause undesirable road conditions (e.g., slipping conditions) at the mine site, among other examples.

U.S. Pat. No. 9,766,637 (the '637 patent) discloses an operation control system for a mining machine. The '637 patent discloses that the operation control system includes information including at least information on moisture content of a travel path on which a mining machine, operating at a mine, runs, and position information on a position of a travel path corresponding to the travel path information. The '637 patent discloses generating speed limit information for changing a speed limit for the mining machine to run on the travel path corresponding to the travel path information. The '637 patent does not disclose determining an appropriate amount of water to be dispensed to be prevent an undesirable amount of dust at a job site and/or to prevent degradation of a ground surface at the job site.

The moisture management device of the present disclosure solves one or more of the problems set forth above and/or other problems in the art.

SUMMARY

In some implementations, a method performed by a moisture management device includes determining a current level of moisture of a section of a ground surface; determining a moisture removal rate of the section of the ground surface; predicting an expected level of moisture of the section of the ground surface at an estimated time of arrival of an autonomous machine with a water dispensing unit, the expected level of moisture being predicted based on the current level of moisture and the moisture removal rate; determining an amount of water to be dispensed by the autonomous machine at the section of the ground surface, the amount of water being determined based on the expected level of moisture and a desired level of moisture; and providing a command, to the autonomous machine, to cause the autonomous machine to dispense the amount of water to the section of the ground surface at the estimated time of arrival.

In some implementations, a device includes one or more memories, and one or more processors configured to: determine a current level of moisture of a section of a ground surface; determine a moisture removal rate of the section of the ground surface; predict an expected level of moisture of the section of the ground surface at a particular time, the expected level of moisture being predicted based on the current level of moisture and the moisture removal rate; determine an amount of water to be dispensed at the section of the ground surface at the particular time, the amount of water being determined based on the expected level of moisture and a desired level of moisture; and provide one or more commands, to one or more autonomous machines, to cause the one or more autonomous machines to dispense the amount of water to the section of the ground surface at the particular time.

In some implementations, a system includes a moisture management device configured to: determine a current level of moisture of a section of a ground surface; determine a moisture removal rate of the section of the ground surface; predict an expected level of moisture of the section of the ground surface at a particular time, the expected level of moisture being predicted based on the current level of moisture and the moisture removal rate; determine an amount of water to be dispensed at the section of the ground surface at the particular time, the amount of water being determined based on the expected level of moisture and a desired level of moisture; and provide one or more commands, to one or more autonomous machines, to cause the one or more autonomous machines to dispense the amount of water to the section of the ground surface at the particular time.

DETAILED DESCRIPTION

Implementations described herein are directed to determining an appropriate amount of water to be provided, by an autonomous machine, to a section of a ground surface. For example, a moisture management device may determine an amount of water to provide to the section of the ground surface at an estimated time of arrival of an autonomous machine and determine an amount of water to be dispensed by the autonomous machine at the section of the ground surface.

In some instances, the moisture management device may determine the amount of water to be dispensed based on a current level of moisture of the section of the ground surface, a current level of moisture of a subsurface of the section of the ground surface, and/or an expected level of moisture of the section of the ground surface. The moisture management device may provide a command, to the autonomous machine, to cause the autonomous machine to dispense the amount of water to the section of the ground surface at the estimated time of arrival.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
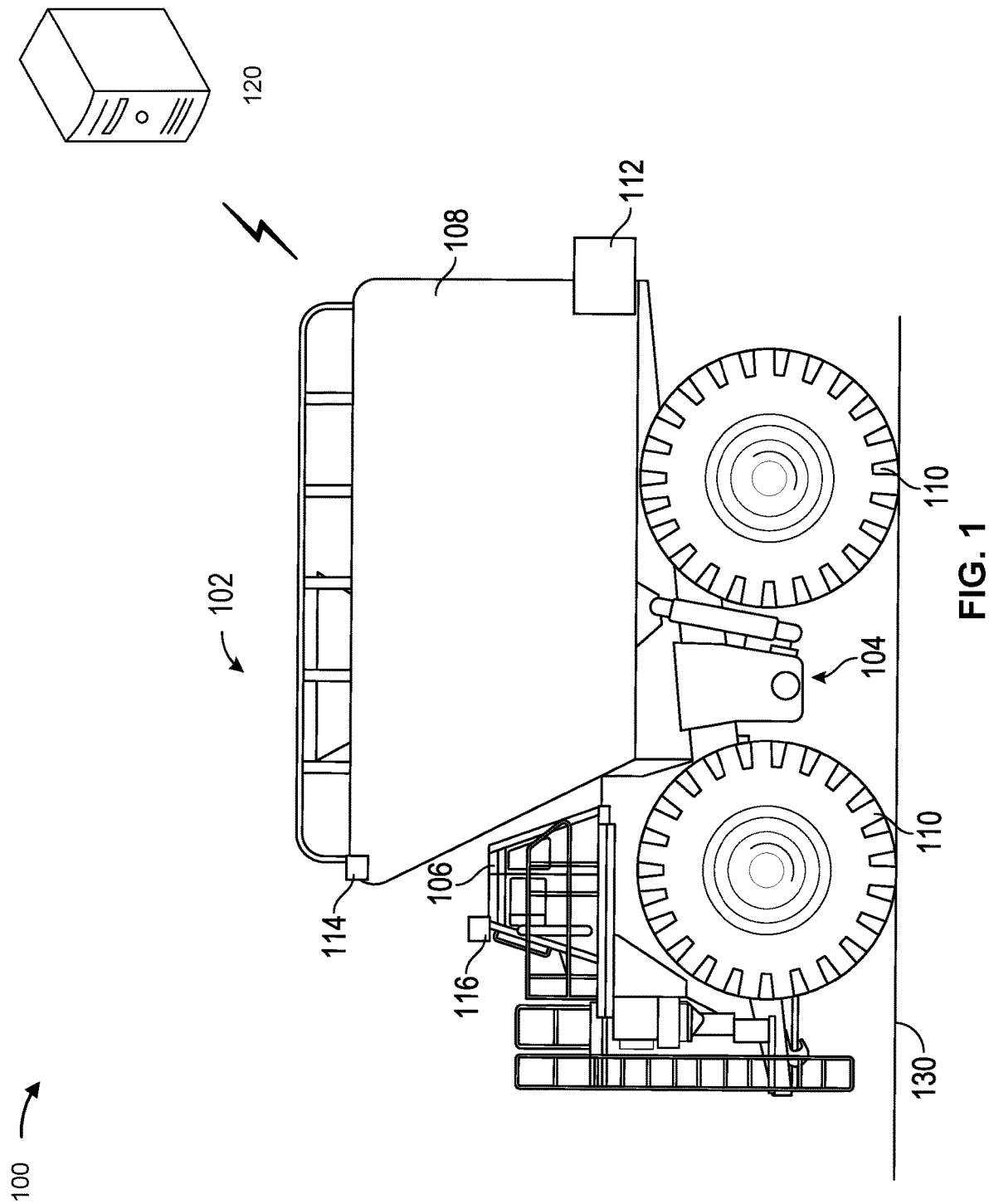
FIG. 1 is a diagram of an example implementation described herein.

FIG. 1 is a diagram of an example implementation 100 described herein. As shown in FIG. 1, example implementation 100 includes a machine 102 and a moisture management device 120. Machine 102 is embodied as a water truck. Alternatively, machine 102 may be another type of machine, such as a wheel loader, among other examples. As shown in FIG. 1, machine 102 may located on a ground surface 130 at the job site.

As shown in FIG. 1, machine 102 includes a frame 104, an operator cabin 106, a liquid tank 108, and ground engaging members 110. Frame 104 may be configured to support operator cabin 106 and liquid tank 108. Operator cabin 130 includes an integrated display (not shown) and operator controls. The operator controls may include one or more input components (e.g., integrated joysticks, push-buttons, control levers, and/or steering wheels) to control an operation of machine 102. For example, the operator controls may be used to control an operation of ground engaging members 110 and/or an operation of liquid tank 108 (e.g., to dispense liquid).

For an autonomous machine, the operator controls may not be designed for use by an operator and, rather, may be designed to operate independently from an operator. In this case, for example, the operator controls may include one or more input components that provide an input signal for use by another component without any operator input. Liquid tank 108 may be configured to receive and store liquid. In some examples, the liquid may be water (e.g., if machine 102 is a water truck). Ground engaging members 110 may be configured to propel machine 102. Ground engaging members 110 may include wheels, tracks, rollers, and/or similar components, for propelling machine 102.

As shown in FIG. 1, machine 102 includes a liquid dispensing unit 112, a global positioning system (GPS) 114, and a wireless communication component 116. Liquid dispensing unit 112 may include one or more devices that are configured to dispense liquid, such as water, liquid fertilizer, herbicide, and/or pesticide, among other examples. In some situations, liquid dispensing unit 112 may supported by frame 106. Liquid dispensing unit 112 may include a fluid container, one or more hoses connected to the fluid container, and/or one or more nozzles connected to the fluid container and/or to the one or more hoses, among other examples.

GPS device 114 may include one or more devices that are capable of receiving, generating, storing, processing, and/or providing signals that may be used to determine a location of machine 102, a velocity of machine 102, a movement of machine 102, an estimated time of arrival of machine 102 at a location, among other examples. As an example, GPS device 114 may generate location data that may be used by moisture management device 120 to determine a location of machine 102 and/or determine the estimated time of arrival.

Wireless communication component 116 may include one or more devices that are capable of communicating with moisture management device 120 and/or one or more other machines, as described herein. As an example, wireless communication component 116 may provide the location data to moisture management device 120. Additionally, or alternatively, wireless communication component 116 may receive a command, from moisture management device 120, to dispense fluid. Wireless communication component 116 may include a transceiver, a separate transmitter and receiver, and/or an antenna, among other examples. Wireless communication component 116 may communicate with moisture management device 120 and/or the one or more machines using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples.

Additionally, or alternatively, wireless communication component 116 may communicate with moisture management device 120 and/or the one or more other machines via a network that includes one or more wired and/or wireless networks.

Moisture management device 120 may include one or more devices that are configured to determine an expected level of moisture of a section of ground surface 130 at a particular time based on a current level of moisture of the section of ground surface 130 and a moisture removal rate of the section of ground surface 130. Moisture management device 120 may be configured to control operations of a plurality of machines (e.g., machine 102) by providing commands to the plurality of machines to cause the plurality of machines to dispense an amount of water that is determined based on the expected level of moisture and a desired level of moisture, as described below. In some examples, the amount of water may be in the form of liter per square meter, gallon per square feet, and/or gallon per square meter, among other examples unit of volume per unit of area.

Moisture management device 120 may perform the actions described herein for multiple sections of ground surface 130. In some situations, each section of ground surface 130 may be of a same size. Alternatively, ground surface 130 may include sections of different sizes. As an example, a section of ground surface 130 may cover an area of one square meter. In some situations, the section of ground surface 130 may cover an area of a different size. For example, a section of ground surface 130 may cover an area of two square meters, five square meters, ten square meters, among other examples. The area may increase in order to more easily support very large active mines where the total number of areas are large. For example, by switching to 2 square meters, processing and memory requirements may be reduced by a factor of 4 (¼ of the requirements of one square meter).

As indicated above, FIG. 1 is provided as an example. Other examples may differ from what was described in connection with FIG. 1.

Figure 2:
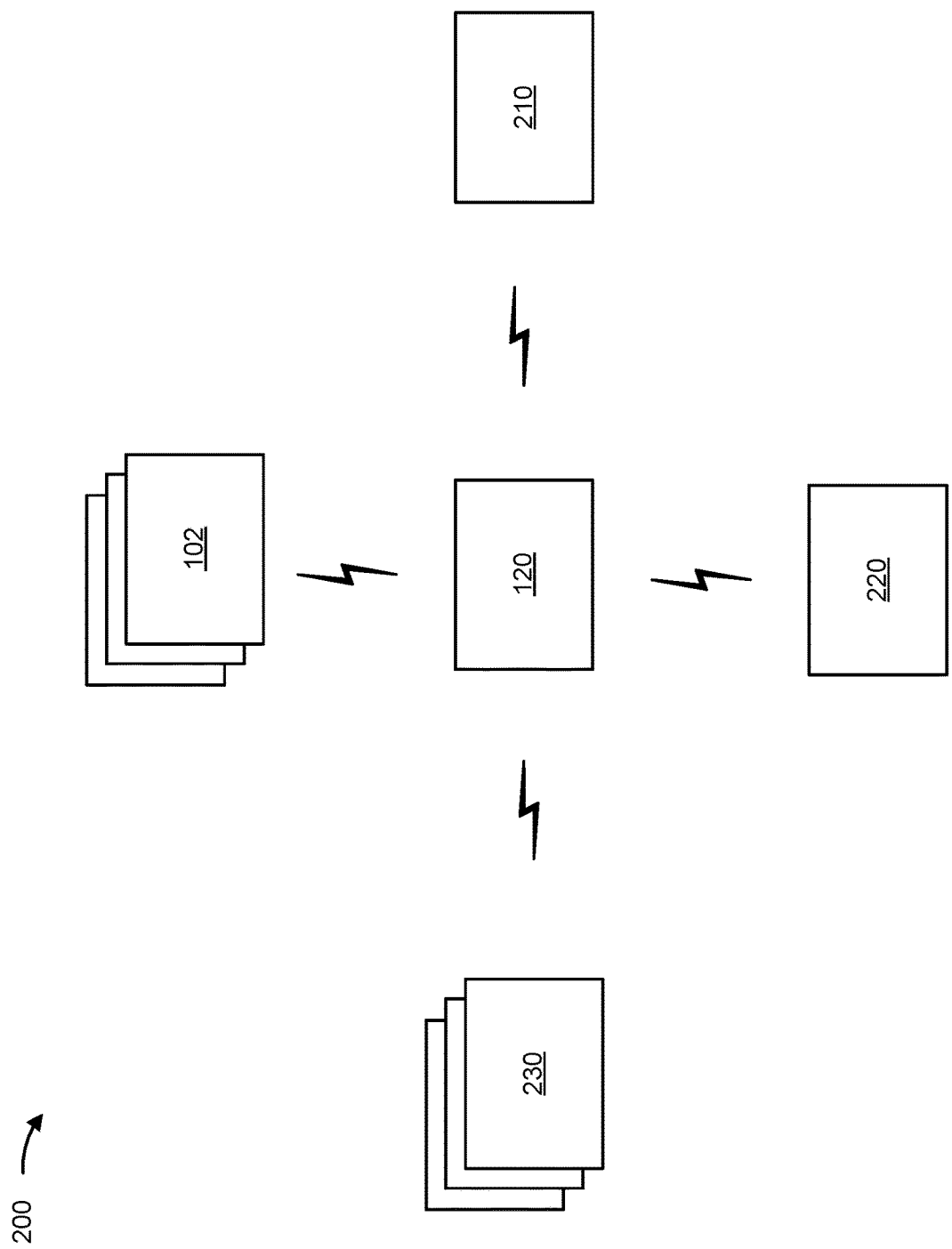
FIG. 2 is a diagram of an example system described herein.

FIG. 2 is a diagram of an example system 200 described herein. As shown in FIG. 2, system 200 includes machines 102, moisture management device 120, a water dispensing information data structure 210, a traffic data structure 220, and environmental sensor devices 230. Some elements of FIG. 2 have been described in connection with FIG. 1.

Water dispensing information data structure 210 may include a database, a table, a sparse matrix, and/or a linked list that stores water dispensing information indicating an amount of water dispensed over a section of ground surface 130. The water dispensing information may be used to determine a current level of moisture of the section, as explained below. In some situations, the water dispensing information may include section information identifying the section. For example, the section information may include geographical coordinates, among other examples of information that may be used to identify a location of the section.

The water dispensing information may further include machine dispensing information indicating an amount of water dispensed by a machine 102 to the section. The machine dispensing information may include information identifying the machine 102, information identifying the amount of water dispensed by the machine 102, information identifying a date and/or a time when the amount of water was dispensed by the machine 102, and/or information identifying a water dispensing capacity of the machine 102.

The information identifying the machine 102 may include a serial number of the machine 102, and/or a media access control address (MAC address) associated with the machine 102, among other examples. The information identifying the water dispensing capacity of the machine 102 may indicate an amount of water that the machine 102 is capable of dispensing based on receiving a command (from moisture management device 120) to dispense water. The machine dispensing information may be stored in water dispensing information data structure 210 in association with section information identifying machine dispensing information.

In some examples, water dispensing information data structure 210 may be updated based on the machine 102 dispensing the amount of water. For example, water dispensing information data structure 210 may be updated based on information provided by the machine 102 (indicating the amount of water that has been dispensed), information provided by moisture management device 120, and/or information provided by a back office system (based on the information provided by moisture management device 120), among other examples. In some examples, the information provided by moisture management device 120 may indicate that the amount of water that has been dispensed by a machine 102.

In some situations, a portion of the machine dispensing information may be stored in a scheduling data structure. For example, the scheduling data structure may include a database, a table, a sparse matrix, and/or a linked list that stores machine scheduling information that includes the information identifying the machine 102, information identifying an amount of water to be dispensed by the machine 102 at onto the section, the information identifying the section, information identifying a date and/or a time when the amount of water is to be dispensed by the machine 102, and/or the information identifying the water dispensing capacity of the machine 102. The machine scheduling information of the machine 102 may be used to determine an amount of water anticipated to be dispensed by another machine 102 to the section of ground surface 130. In some examples, scheduling data structure may be updated based on moisture management device 120 providing a command to the machine 102 to dispense the amount of water.

Traffic data structure 220 may include a database, a table, and/or a linked list that stores traffic data regarding one or more machines traveling over the section of ground surface 130. The traffic data may include information identifying a quantity of the one or more machines, a frequency of the one or more machines traveling over the section, information identifying a temperature of ground engaging members of the one or more machines when traveling over the section, and/or information identifying an amount of dirt removed from ground surface 130 as a result of the one or more machines traveling over the section, among other examples. The traffic data may be used by moisture management device 120 to determine a moisture removal rate of the section of ground surface 130 (e.g., an evaporation rate of the section), as explained below.

Environmental sensor devices 230 may include one or more devices configured to sense environmental conditions associated with the section of ground surface 130 and generate sensor data indicating the environmental conditions. The environmental conditions may include a temperature at a location associated with the section of ground surface 130, a measure of humidity associated with the location, a wind speed associated with the location, and/or a measure of overcast associated with the location, among other examples. Accordingly, the sensor data may indicate the temperature, the measure of humidity, the wind speed, and/or the measure of overcast, among other examples. The sensor data may be used to determine the moisture removal rate. Environmental sensor devices 230 may be provided on one or more machines 102, and/or on one or more stand-alone devices located within a threshold distance of the section, among other examples.

As explained above, moisture management device 120 may be configured to determine an amount of water that is to be dispensed by the machine 102 at the section of ground surface 130 based on an expected level of moisture of the section of ground surface 130 and a desired level of moisture for the section. Moisture management device 120 may be configured to determine the expected level of moisture of the section of ground surface 130 based on the current level of moisture of the section and the moisture removal rate of the section. In some examples, moisture management device 120 may be preconfigured with information identifying the desired level of moisture. Additionally, or alternatively, moisture management device 120 may obtain information indicating the desired level of moisture from a device of a site manager of the job site, and/or from a back office system, among other examples.

In some situations, moisture management device 120 may determine the current level of moisture of the section based on the water dispensing information associated with the section. For example, moisture management device 120 may perform a lookup of water dispensing information data structure 210 using information identifying the section and obtain the water dispensing information associated with the section based on performing the lookup. The water dispensing information may include machine dispensing information indicating the amount of water dispensed by a machine 102 to the section. Moisture management device 120 may determine the current level of moisture based on the information identifying the amount of water dispensed. For example, the information identifying the amount of water dispensed may indicate the current level of moisture. In some examples, moisture management device 120 may determine the current level of moisture using a model (e.g., a mathematical model). The model may take, as an input, the amount of water dispensed and may provide, as an output, a level of moisture.

Additionally, or alternatively to obtaining the water dispensing information, moisture management device 120 may obtain information identifying the current level of moisture from a device, such as the device of the site manager of the job site, and/or from the back office system, among other examples. In some examples, the information identifying the current level of moisture may be based on an actual measurement of a level of moisture at the section. Additionally, or alternatively, moisture management device 120 may obtain the water dispensing information from the device of the site manager of the job site, from another machine 102, and/or from the back office system, among other examples.

In some situations, moisture management device 120 may determine a current level of moisture of a subsurface of the section of ground surface 130. For instance, moisture management device 120 may determine the current level of moisture of the subsurface based on the current level of moisture of the section and the moisture removal rate. Moisture management device 120 may determine an amount of moisture removed from the section of ground surface 130 based on the moisture removal rate. As an example, as the current level of moisture of the section decreases and the section continues to experience moisture removal, the value may continue to decrease. In this regard, the current level of moisture of the subsurface may be a value that is less than a lowest value for the current level of moisture of the section. As an example, moisture management device 120 may determine that the current level of moisture of the section of ground surface 130 is 1 and the current level of moisture of the subsurface is 0.8 (which is 0.2 less than 1—a lowest value of the for the current level of moisture of the section).

In some instances, moisture management device 120 may determine the moisture removal rate based on the traffic data regarding the one or more machines traveling over the section of ground surface 130. For example, moisture management device 120 may perform a lookup of traffic data structure 220 using the information identifying the section and may obtain the traffic data based on the lookup. Moisture management device 120 may determine the moisture removal rate based on the traffic data. As an example, the moisture removal rate may increase as the quantity of the one or more machines increases, as the frequency of the one or more machines traveling over the section increases, as the temperature of ground engaging members of the one or more machines increases, and/or as the amount of dirt removed increases, among other examples.

Additionally, or alternatively to determining the moisture removal rate based on the traffic data, moisture management device 120 may determine the moisture removal rate based on the sensor data. As an example, the moisture removal rate may increase as the temperature at the location associated with the section of ground surface 130 increases, as the measure of humidity associated with the location decreases, as the wind speed associated with the location increases, and/or as the measure of overcast decreases, among other examples.

Additionally, or alternatively to determining the moisture removal rate based on the sensor data, moisture management device 120 may determine the moisture removal rate based on historical data regarding the environmental conditions.

Moisture management device 120 may determine the expected level of moisture of the section of ground surface 130 at a particular time in the future. In some examples, the particular time may be an estimated time of arrival of one or more machines 102 identified by moisture management device 120. Moisture management device 120 may determine the expected level of moisture based on the current level of moisture of the section, the current level of moisture of the subsurface, and/or the moisture removal rate. In some situations, moisture management device 120 may predict the expected level of moisture using a model (e.g., a machine learning model).

In some situations, the machine learning model may be trained using historical data that includes historical data regarding levels of moisture (of the section and/or of the subsurface), historical data regarding moisture removal rates, historical data regarding predicted levels of moisture, and/or historical data regarding times, among other examples. The historical data may further include historical data regarding humidity, temperature, wind speed, among other examples, as determined by a station. The machine learning model may be generated and trained by a trainer device, which may be a discrete hardware component or software component (not shown). The trainer device may be included in moisture management device 120, and/or the back office system, among other examples.

In some examples, when predicting the expected level of moisture of the section, moisture management device 120 may provide the current level of moisture of the section, the current level of moisture of the subsurface, the moisture removal rate, and the particular time as inputs to the machine learning model. The machine learning model may provide, as an output, the expected level of moisture.

Moisture management device 120 may determine an amount of water to be dispensed at the section of ground surface 130. In some instances, moisture management device 120 may determine the amount of water based on the expected level of moisture and the desired level of moisture. For example, moisture management device 120 may determine the amount of water by a difference between the desired level of moisture and the expected level of moisture.

In some instances, moisture management device 120 may determine the amount of water to be dispensed based on an anticipated amount of water anticipated to be dispensed at the particular time. For example, moisture management device 120 may perform a lookup of the scheduling data structure using the information identifying the section and the particular time and may obtain, based on the lookup, the machine scheduling information associated with the section of ground surface 130. The machine scheduling information may include the information identifying the anticipated amount of water anticipated to be dispensed at the section at the particular time. In this regard, moisture management device 120 may determine the amount of water to be dispensed based on a difference between the desired level of moisture and a combination of the expected level of moisture and the anticipated amount of water anticipated to be dispensed.

In some instances, moisture management device 120 may identify a machine 102 that is capable of dispensing the amount of water. For example, moisture management device 120 may perform a lookup of a data structure that stores information identifying different machines 102 in association with information identifying a water dispensing capacity of the different machines 102. Moisture management device 120 may perform the lookup based on information identifying the amount of water. In some situations, based on performing the lookup, moisture management device 120 may identify a machine 102 that is capable of dispensing an entirety of the amount of water. In this regard, moisture management device 120 may provide a command to the machine 102 to cause the machine 102 to dispense the amount of water to the section of ground surface 130 at the particular time.

In some situations, based on performing the lookup, moisture management device 120 may identify multiple machines 102. For example, moisture management device 120 may identify a first machine 102 that is capable of dispensing a first portion of the amount of water and identify a second machine 102 that is capable of dispensing a second portion of the amount of water. In this regard, moisture management device 120 may provide commands to the first machine 102 and the second machine 102 to cause the first machine 102 and the second machine 102 to dispense the amount of water to the section of ground surface 130 at the particular time.

Moisture management device 120 may perform the actions described herein for multiple sections of ground surface 130. While the examples described herein have been discussed with respect to dispensing water, the examples described herein are applicable to dispensing other fluids, as such liquid fertilizer, herbicide, and/or pesticide, among other examples. Additionally, or alternatively, the examples may include other agents with the liquid which are sometimes added (like detergent) to reduce the rate of evaporation.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
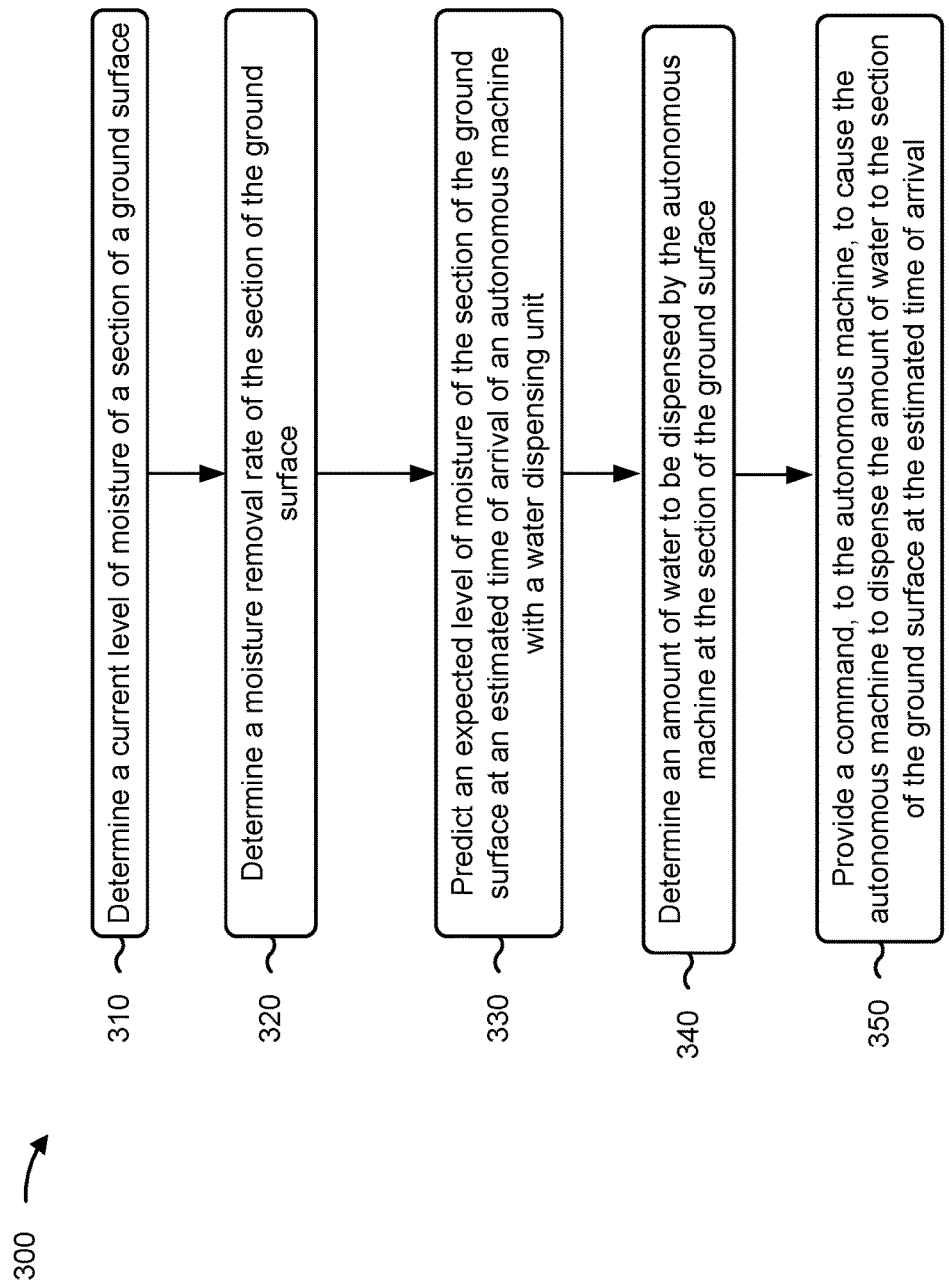
FIG. 3 is a flowchart of an example process associated with water dispensing management.

FIG. 3 is a flowchart of an example process 300 associated with water dispensing management. In some implementations, one or more process blocks of FIG. 3 may be performed by a moisture management device (e.g., moisture management device 120). In some implementations, one or more process blocks of FIG. 3 may be performed by another device or a group of devices separate from or including the device, such as machine 102 and/or environment sensor devices 230.

As shown in FIG. 3, process 300 may include determining a current level of moisture of a section of a ground surface (block 310). For example, the moisture management device may determine a current level of moisture of a section of a ground surface.

Determining the current level of moisture may comprise obtaining water dispensing information indicating an amount of water dispensed over the section of the ground surface; and determining the current level of moisture based on the water dispensing information.

As further shown in FIG. 3, process 300 may include determining a moisture removal rate of the section of the ground surface (block 320). For example, the moisture management device may determine a moisture removal rate of the section of the ground surface.

Determining the moisture removal rate may comprise obtaining traffic data regarding one or more machines traveling over the section of the ground surface; and determining the moisture removal rate based on the traffic data.

Determining the moisture removal rate may comprise determining environmental conditions associated with the section of the ground surface; and determining the moisture removal rate based on the environmental conditions.

As further shown in FIG. 3, process 300 may include predicting an expected level of moisture of the section of the ground surface at an estimated time of arrival of an autonomous machine with a water dispensing unit, the expected level of moisture being predicted based on the current level of moisture and the moisture removal rate (block 330). For example, the moisture management device may predict an expected level of moisture of the section of the ground surface at an estimated time of arrival of an autonomous machine with a water dispensing unit, the expected level of moisture being predicted based on the current level of moisture and the moisture removal rate.

As further shown in FIG. 3, process 300 may include determining an amount of water to be dispensed at the section of the ground surface at the particular time, the amount of water being determined based on the expected level of moisture and a desired level of moisture (block 340). For example, the moisture management device may determine an amount of water to be dispensed at the section of the ground surface at the particular time, the amount of water being determined based on the expected level of moisture and a desired level of moisture.

In some situations, the amount of water is a first amount of water, the autonomous machine is a first autonomous machine, and determining the first amount of water to be provided comprises: determining a second amount of water anticipated to be dispensed by a second autonomous machine at the section of the ground surface; and determining the first amount of water based on the expected level of moisture, the desired level of moisture, and the second amount of water.

As further shown in FIG. 3, process 300 may include providing a command, to the autonomous machine, to cause the autonomous machine to dispense the amount of water to the section of the ground surface at the estimated time of arrival (block 350). For example, the moisture management device may provide a command, to the autonomous machine, to cause the autonomous machine to dispense the amount of water to the section of the ground surface at the estimated time of arrival.

In some situations, the autonomous machine is a first autonomous machine, and providing the command comprises determining a water dispensing capacity of the autonomous machine; determining that the first autonomous machine is capable of providing a first portion of the amount of water based on the water dispensing capacity; identifying a second autonomous machine capable of providing a second portion of the amount of water; providing a first command, to the first autonomous machine, to cause the first autonomous machine to dispense the first portion of the amount of water to the section of the ground surface at the estimated time of arrival; and providing a second command, to the second autonomous machine, to cause the second autonomous machine to dispense the second portion of the amount of water to the section of the ground surface.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

Implementations described herein are directed to determining an appropriate amount of water to be dispensed, by an autonomous machine, to a section of a ground surface (of a mine site) at a particular time. A command may be provided to the autonomous machine to cause the autonomous machine to dispense the appropriate amount of water.

Typically, the mine site may be subject to an undesirable amount of dust from a ground surface. In some situations, an excessive amount of water may be provided in an effort to suppress the dust. The undesirable amount of dust and/or the excessive amount of water may cause damage to machines at the mine site, may prevent the machines from properly performing the tasks, or may cause undesirable road conditions (e.g., slipping conditions) at the mine site, among other examples.

Implementations described herein are directed to determining an expected level of moisture of the section of the ground surface and determining an amount of water to be dispensed at the section of the ground surface based on the expected level of moisture. Predicting the expected level of moisture and determining the amount of water based on the expected level of moisture may provide multiple advantages. For example, by predicting the expected level of moisture and determining the amount of water based on the expected level of moisture, the moisture management device may ensure that the appropriate amount of water is dispensed at the section of the ground surface.

By ensuring that the appropriate amount of water is dispensed at the section of the ground surface, the moisture management device may prevent the mine site from being subject to the undesirable amount of dust and/or prevent the ground surface from being subject to degradation. Accordingly, by predicting the expected level of moisture and determining the amount of water based on the expected level of moisture, the moisture management device may prevent damage to the machines, may prevent the machines from properly performing the tasks, or may prevent damage at the mine site, among other examples.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method performed by a moisture management device, the method comprising:
    determining a current level of moisture of a section of a ground surface;
    determining a moisture removal rate of the section of the ground surface;
    predicting an expected level of moisture of the section of the ground surface at an estimated time of arrival of an autonomous machine with a water dispensing unit,
        the expected level of moisture being predicted based on the current level of moisture and the moisture removal rate;
    determining an amount of water to be dispensed by the autonomous machine at the section of the ground surface,
        the amount of water being determined based on the expected level of moisture and a desired level of moisture; and
    providing a command, to the autonomous machine, to cause the autonomous machine to dispense the amount of water to the section of the ground surface at the estimated time of arrival.

2. The method of claim 1, wherein determining the amount of water comprises:
    determining a current level of moisture of a subsurface of the section of the ground surface; and
    determining the amount of water based on the current level of moisture of the section of the ground surface, the current level of moisture of the subsurface, and the moisture removal rate.

3. The method of claim 1, wherein determining the moisture removal rate comprises:
    obtaining traffic data regarding one or more machines traveling over the section of the ground surface; and
    determining the moisture removal rate based on the traffic data.

4. The method of claim 1, wherein determining the moisture removal rate comprises:
    determining environmental conditions associated with the section of the ground surface; and
    determining the moisture removal rate based on the environmental conditions.

5. The method of claim 1, wherein determining the current level of moisture comprises:
    obtaining water dispensing information indicating an amount of water dispensed over the section of the ground surface; and
    determining the current level of moisture based on the water dispensing information.

6. The method of claim 1, wherein the amount of water is a first amount of water,
    wherein the autonomous machine is a first autonomous machine, and
    wherein determining the first amount of water to be provided comprises:
        determining a second amount of water anticipated to be dispensed by a second autonomous machine at the section of the ground surface; and
        determining the first amount of water based on the expected level of moisture, the desired level of moisture, and the second amount of water.

7. The method of claim 1, wherein the autonomous machine is a first autonomous machine, and
    wherein providing the command comprises:
        determining a water dispensing capacity of the autonomous machine;

determining that the first autonomous machine is capable of providing a first portion of the amount of water based on the water dispensing capacity;

identifying a second autonomous machine capable of providing a second portion of the amount of water;

providing a first command, to the first autonomous machine, to cause the first autonomous machine to dispense the first portion of the amount of water to the section of the ground surface at the estimated time of arrival; and providing a second command, to the second autonomous machine, to cause the second autonomous machine to dispense the second portion of the amount of water to the section of the ground surface.

8. The method of claim 1, wherein the expected level of moisture of the section of the ground surface at the estimated time of arrival of the autonomous machine based on location data associated with the autonomous machine.

9. A device, comprising:
one or more memories; and
one or more processors, in communication with one or more memories, configured to:
  determine a current level of moisture of a section of a ground surface;
  determine a moisture removal rate of the section of the ground surface;
  predict an expected level of moisture of the section of the ground surface at a particular time,
    the expected level of moisture being predicted based on the current level of moisture and the moisture removal rate, and
    the particular time being an estimated time of arrival of one or more autonomous machines that each has a water dispensing unit;
  determine an amount of water to be dispensed at the section of the ground surface at the particular time,
    the amount of water being determined based on the expected level of moisture and a desired level of moisture; and
  provide one or more commands, to the one or more autonomous machines, to cause the one or more autonomous machines to dispense the amount of water to the section of the ground surface at the particular time.

10. The device of claim 9, wherein, to provide the one or more commands, the one or more processors are configured to:
  determine a first water dispensing capacity of a first autonomous machine of the one or more autonomous machines;
  determine a second water dispensing capacity of a second autonomous machine of the one or more autonomous machines; and
  provide the one or more commands, to the first autonomous machine and the second autonomous machine, based on the first water dispensing capacity and the second water dispensing capacity.

11. The device of claim 9, wherein, to predict the expected level of moisture, the one or more processors are configured to:
  predict the expected level of moisture using a model,
    wherein the current level of moisture and the moisture removal rate are provided as inputs to the model, and
    wherein an output of the model is the expected level of moisture.

12. The device of claim 9, wherein, to determine the moisture removal rate, the one or more processors are configured to:
  determine environmental conditions associated with the section of the ground surface; and
  determine the moisture removal rate based on the environmental conditions.

13. The device of claim 12, wherein, to determine the environmental conditions, the one or more processors are configured to:
  determine one or more of a temperature at a location associated with the section of the ground surface, a measure of humidity associated with the location, or a wind speed associated with the location; and
  determine the moisture removal rate based on the one or more of the temperature, the measure of humidity, or the wind speed.

14. The device of claim 9, wherein, to determine the current level of moisture, the one or more processors are configured to:
  obtain water dispensing information indicating an amount of water dispensed by one or more machines over the section of the ground surface; and
  determine the current level of moisture based on the water dispensing information.

15. The device of claim 14, wherein, to obtain the water dispensing information, the one or more processors are configured to:
  obtain the water dispensing information from the one or more machines; or
  obtain the water dispensing information from one or more devices.

16. A system, comprising:
one or more memories; and
one or more processors, in communication with one or more memories, configured to:
  determine a current level of moisture of a section of a ground surface;
  determine a moisture removal rate of the section of the ground surface;
  predict an expected level of moisture of the section of the ground surface at a particular time,
    the expected level of moisture being predicted based on the current level of moisture and the moisture removal rate, and
    the particular time being an estimated time of arrival of one or more autonomous machines that each has water dispensing unit;
  determine an amount of water to be dispensed at the section of the ground surface at the particular time,
    the amount of water being determined based on the expected level of moisture and a desired level of moisture; and
  provide one or more commands, to the one or more autonomous machines, to cause the one or more autonomous machines to dispense the amount of water to the section of the ground surface at the particular time.

17. The system of claim 16, wherein, to determine the amount of water, the one or more processors are configured to:
  determine a current level of moisture of a subsurface of the section of the ground surface; and
  determine the amount of water based on the current level of moisture of the section of the ground surface, the current level of moisture of the subsurface, and the moisture removal rate.

18. The system of claim 16, wherein, to determine the moisture removal rate, the one or more processors are configured to:
at least one of:
obtain traffic data regarding the one or more autonomous machines traveling over the section of the ground surface, or
determine environmental conditions associated with the section of the ground surface; and
determine the moisture removal rate based on the at least one of the traffic data or the environmental conditions.

19. The system of claim 16, wherein, to determine the current level of moisture, the one or more processors are configured to:
obtain water dispensing information indicating an amount of water dispensed over the section of the ground surface; and
determine the current level of moisture based on the water dispensing information.

20. The system of claim 16, wherein, to determine the current level of moisture, the one or more processors are configured to:
determine the current level of moisture using a first model; and
wherein, to predict the expected level of moisture, the the one or more processors are configured to:
predict the expected level of moisture using a second model.

* * * * *